United States Patent
Wahl

(10) Patent No.: US 8,132,239 B2
(45) Date of Patent: Mar. 6, 2012

(54) SYSTEM AND METHOD FOR VALIDATING REQUESTS IN AN IDENTITY METASYSTEM

(75) Inventor: Mark Frederick Wahl, Austin, TX (US)

(73) Assignee: Informed Control Inc., Austin, TX (US)

( * ) Notice: Subject to any disclaimer, the term of this patent is extended or adjusted under 35 U.S.C. 154(b) by 847 days.

(21) Appl. No.: 12/214,615

(22) Filed: Jun. 21, 2008

(65) Prior Publication Data

US 2010/0005512 A1  Jan. 7, 2010

Related U.S. Application Data

(60) Provisional application No. 60/936,793, filed on Jun. 22, 2007.

(51) Int. Cl.
*G06F 7/04* (2006.01)

(52) U.S. Cl. .......................................... 726/4; 713/150

(58) Field of Classification Search ...... 726/4; 713/150, 713/168; 455/411
See application file for complete search history.

(56) References Cited

U.S. PATENT DOCUMENTS

| | | | |
|---|---|---|---|
| 7,987,228 B2* | 7/2011 | McKeown et al. | 709/202 |
| 2004/0261116 A1* | 12/2004 | Mckeown et al. | 725/109 |
| 2006/0200667 A1* | 9/2006 | Cameron et al. | 713/168 |
| 2006/0264201 A1* | 11/2006 | Zhang | 455/411 |
| 2009/0132813 A1* | 5/2009 | Schibuk | 713/158 |

* cited by examiner

*Primary Examiner* — Samson Lemma

(57) ABSTRACT

An information processing system in a computer network comprising an edge system, an identity provider, a relying party and a tracing service, in which the tracing service relays a queue of information of authorized user activity from a relying party to an identity provider, which then can provide that activity information to the user.

7 Claims, 26 Drawing Sheets

RELYING PARTY TABLE

| RP UNIQUE ID | RP NAME | NETWORKS | CREDENTIAL | STATE |
|---|---|---|---|---|
|  |  |  |  |  |
|  |  |  |  |  |

280

IDENTITY PROVIDER TABLE

| IDP UNIQUE ID | IDP NAME | NETWORKS | CREDENTIAL | STATE |
|---|---|---|---|---|
|  |  |  |  |  |
|  |  |  |  |  |

282

PEERING TABLE

| RP UNIQUE ID | IDP UNIQUE ID | STATE |
|---|---|---|
|  |  |  |
|  |  |  |

CERTIFICATE TABLE

| UNIQUE ID | ISSUER | SERIAL | CERT | PATH | STATE |
|---|---|---|---|---|---|
| | | | | | |
| | | | | | |

294

TRACE TABLE

| RP UNIQUE ID | EVENT UNIQUE ID | EVENT DATE | CLIENT | USER | TRACE | IDP UNIQUE ID | STATE | LAST ACCESS DATE |
|---|---|---|---|---|---|---|---|---|
| | | | | | | | | |
| | | | | | | | | |

USER TABLE

| USER UNIQUE ID | USER NAME | CREDENTIALS | STATUS |
|---|---|---|---|
|  |  |  |  |
|  |  |  |  |

390

TRACE TABLE

| USER UNIQUE ID | EVENT UNIQUE ID | RP UNIQUE ID | RP NAME | EVENT DATE | CLIENT | TRACE |
|---|---|---|---|---|---|---|
|  |  |  |  |  |  |  |
|  |  |  |  |  |  |  |

392

RELYING PARTY TABLE

| RP UNIQUE ID | RP NAME | STATE |
|---|---|---|
|  |  |  |
|  |  |  |

TRACE TABLE

| IDP | EVENT UNIQUE ID | RP UNIQUE ID | RP NAME | EVENT DATE | CLIENT | TRACE | STATUS |
|---|---|---|---|---|---|---|---|
|  |  |  |  |  |  |  |  |
|  |  |  |  |  |  |  |  |

490

NETWORK TABLE

| START DATE | END DATE | INTERFACE | DHCP SERVER | INT ADDRESS |
|---|---|---|---|---|
|  |  |  |  |  |
|  |  |  |  |  |

SYSTEM AND METHOD FOR VALIDATING REQUESTS IN AN IDENTITY METASYSTEM

CROSS-REFERENCE TO RELATED APPLICATION

This application claims the benefit of PPA Ser. No. 60/936,793, "System and Method for Claims Tracing in an Authentication Service" filed Jun. 22, 2007 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of Invention

This invention relates generally to the management of identity information in computer networks.

2. Prior Art

An Identity Metasystem is a collection of interoperable computing elements on a computer network which enables users of the services provided by the network to manage and exchange their digital identities. In an Identity Metasystem, an Identity Provider is a network server responsible for authenticating users, and a Relying Party is a network server which requires an authenticated user identity in order to provide service. The Identity Metasystem defines the mechanisms that enable a Relying Party to validate that a user requesting service from that Relying Party has been previously authenticated by an Identity Provider, in which the Relying Party is a web service based on the Simple Object Access Protocol (SOAP), or web server based on the Hypertext Transfer Protocol (HTTP).

The document "A Technical Reference for the Information Card Profile V1.0", published in December 2006 by Microsoft Corporation, describes the network communication protocols by which an Identity Selector may obtain the token requirements of a Replying Party, then authenticate to an Identity Provider, and finally send a token obtained from an Identity Provider to a Relying Party. The protocols defined in "A Technical Reference for InfoCard v1.0 in Windows" specify a protocol exchange in which the protocols defined in the documents Web Services Security: SOAP Message Security 1.0 (WS-Security 2004), Web Services Trust Language (WS-Trust), Web Services Security Policy Language (WS-SecurityPolicy) and Web Services Metadata Exchange (WS-MetadataExchange), all of which are based on the Simple Object Access Protocol (SOAP), are to be used for the communication between the Identity Selector and the Relying Party. The Simple Object Access Protocol is typically used between applications in a web services framework.

The document "A Guide to Supporting InfoCard v1.0 Within Web Applications and Browsers", published in March 2006 by Microsoft Corporation, describes the network communication protocols by which an Identity Selector may obtain the token requirements of a Relying Party and send a token obtained from an Identity Provider to a Relying Party using the Hypertext Transfer Protocol (HTTP) and Hypertext Markup Language (HTML). The Hypertext Transfer Protocol is typically used by a web browser to communicate with a web server to web application.

FIG. 2 illustrates the components of the prior art of identity metasystem. In the prior art, a user will contact a Relying Party service using their web browser client. The Relying Party will prompt the user to authenticate, and the client will display an Identity Selector, by which the user may select a managed card issued by an Identity Provider. The Identity Selector will contact the Identity Provider, and obtain a token for the Relying Party. The Relying Party will receive this token from the Identity Selector, and from it extract one or more claims about the user.

SUMMARY

This invention extends the identity metasystem to add a new component, a tracing service. The tracing service provides an intermediary by which the activities of an Identity Selector can be followed. An Identity Provider will include a trace claim in a token for a Relying Party, and the Relying Party will forward the contents of this claim to a tracing service. The Identity Provider can then retrieve from the tracing service the list of claims which had been supplied by its users to relying parties. A user can then obtain from their Identity Providers a list of these claims, and can compare them to the date and network address of their computer.

DRAWINGS—FIGURES

FIG. 8A and FIG. 8B are a diagram illustrating the tables of a tracing service trace database (28).

FIG. 11 is a diagram illustrating the tables of an identity provider user database (16).

FIG. 13 is a diagram illustrating the tables of an edge system activity database (40).

DRAWINGS—REFERENCE NUMERALS

Figure 1:
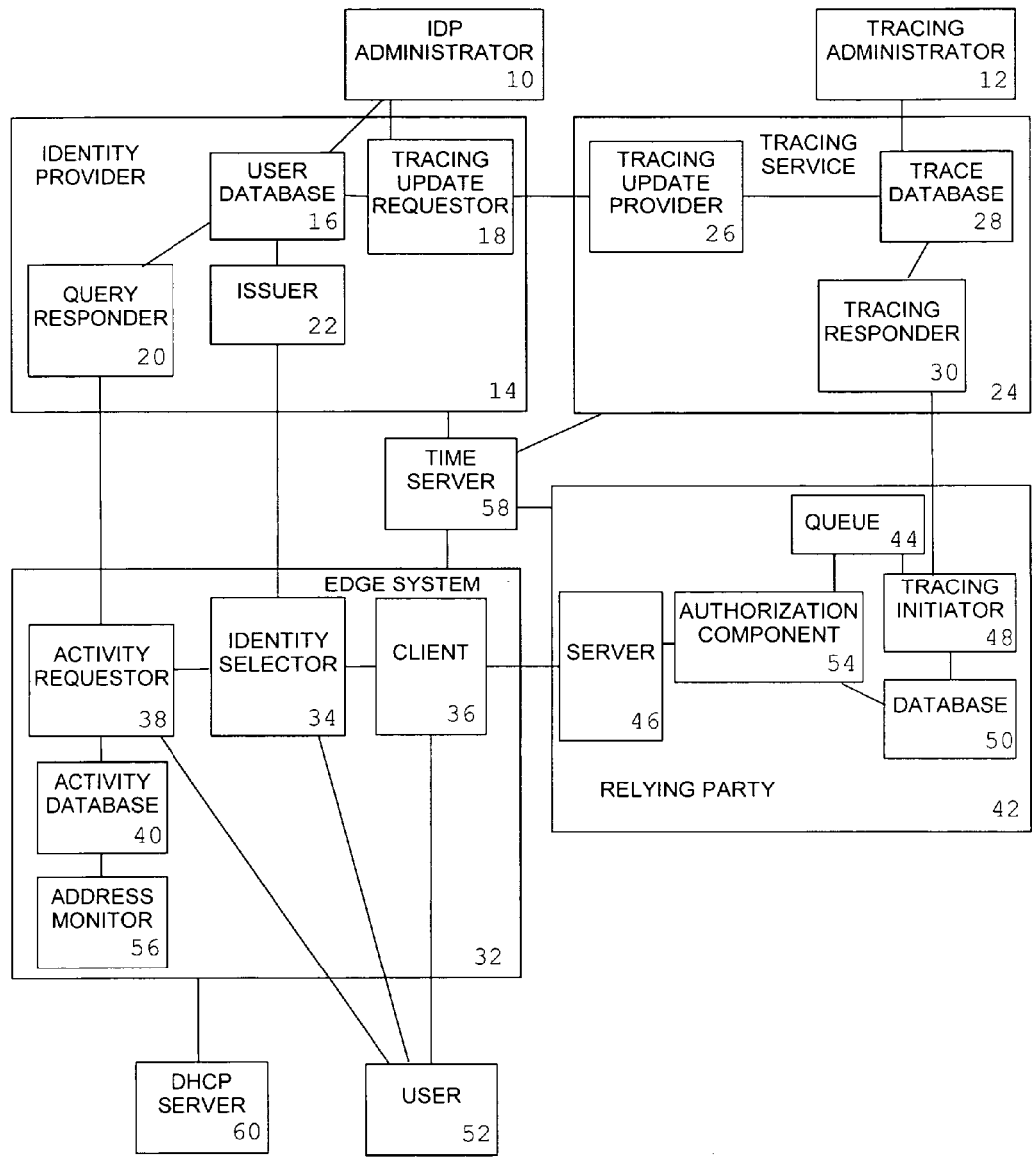
FIG. 1 is a diagram that illustrates the components of the system for validating requests in an identity metasystem.
Figure 2:
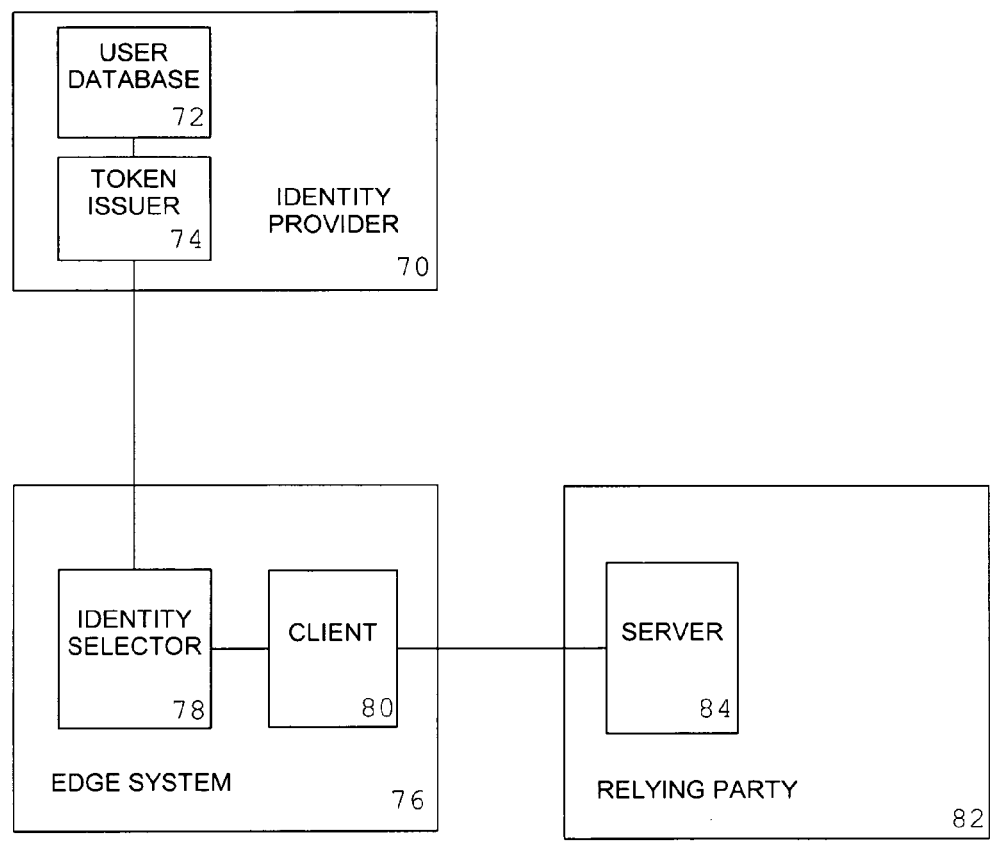
FIG. 2 is a diagram that illustrates the components of a prior art authentication procedure.

10 IDP administrator
12 Tracing administrator
14 Identity provider
16 Identity provider user database component
18 Identity provider tracing update requestor component
20 Identity provider query responder component
22 Identity provider issuer component
24 Tracing service
26 Tracing service tracing update provider component
28 Tracing service trace database component
30 Tracing service tracing responder component
32 Edge system
34 Edge system identity selector component
36 Edge system client component
38 Edge system activity requestor component
40 Edge system activity database component
42 Relying party
44 Relying party queue component
46 Relying party server component
48 Relying party tracing initiator component
50 Relying party database component
52 User
54 Relying party authorization component
56 Edge system address monitor
58 Time server component
60 DHCP server
70 Identity provider
72 Identity provider user database component
74 Identity provider token issuer component
76 Edge system
78 Edge system identity selector component
80 Edge system client component
82 Relying party
84 Relying party server component
280 Tracing service database relying party table
282 Tracing service database identity provider table
284 Tracing service database peering table
294 Tracing service database certificate table
296 Tracing service database trace table
390 Identity provider database user table
392 Identity provider database trace table
490 Edge system database trace table
492 Edge system database network table
530 Relying party network
532 Relying party database server computer
534 Relying party internet service provider
536 Relying party firewall router
538 Relying party DMZ switch
540 Relying party internal firewall
542 Relying party intranet switch
544 Relying party RP server computer
546 Relying party tracing initiator computer
550 Tracing service network
552 Tracing service database server computer
554 Tracing service internet service provider
556 Tracing service firewall router
558 Tracing service DMZ switch
560 Tracing service internal firewall
562 Tracing service intranet switch
564 Tracing service administrator workstation computer
566 Tracing service frontend computer
568 Tracing service tracing application computer
570 Identity provider network
572 Identity provider database server computer
574 Identity provider Internet service provider
576 Identity provider firewall router
578 Identity provider DMZ switch
580 Identity provider internal firewall
582 Identity provider intranet switch
584 Identity provider administrator workstation computer
586 Identity provider frontend computer
588 Identity provider IDP server computer
600 Server computer
602 Server computer CPU
604 Server computer hard disk interface
606 Server computer system bus
608 Server computer BIOS ROM
610 Server computer hard disk
612 Server computer operating system stored on hard disk
614 Server computer applications stored on hard disk
616 Server computer RAM
618 Server computer operating system state in RAM
620 Server computer application state in RAM
622 Server computer network interface
624 Local area network switch
640 Workstation computer
642 Workstation computer CPU
644 Workstation computer monitor
646 Workstation computer video interface
648 Workstation computer system bus
650 Workstation computer USB interface
652 Workstation computer keyboard
654 Workstation computer mouse
656 Workstation computer hard disk interface
658 Workstation computer BIOS ROM
660 Workstation computer hard disk
662 Workstation computer operating system stored on hard disk
664 Workstation computer applications stored on hard disk
666 Workstation computer network interface
668 Workstation computer RAM
670 Workstation computer operating system state in RAM
672 Workstation computer application state in RAM
674 LAN switch
690 Home computer
692 Home computer CPU
694 Home computer monitor
696 Home computer video interface
698 Home computer system bus
700 Home computer USB interface
702 Home computer keyboard
704 Home computer mouse
706 Home computer hard disk interface
708 Home computer BIOS ROM
710 Home computer hard disk
712 Home computer operating system stored on hard disk
714 Home computer applications stored on hard disk
716 Home computer network interface
718 Home computer RAM
720 Home computer operating system state in RAM
722 Home computer application state in RAM
724 Cable/DSL modem
726 Connection to ISP

DETAILED DESCRIPTION—PREFERRED EMBODIMENT

This invention comprises the following four major groups of components:
an edge system (32), comprising an identity selector component (34), a client component (36), an activity requestor component (38), an activity database component (40) and an address monitor component (56), a relying party (42), comprising a server component (46), an authorization component (54), a queue component (44), a tracing initiator component (48), and a relying party database component (50), a tracing service (24), comprising a tracing responder component (30), a trace database component (28), and a tracing update provider component (26), and an identity provider (14), comprising a tracing update requestor component (18), a user database component (16), an issuer component (22), and a query responder component (20).

The edge system identity selector component (34) is a software element on the edge system. This component is activated by the client (36) when the client needs to authenticate to a relying party server (46). The identity selector authenticates the user (52) to the identity provider issuer (22), and if this is successful, transfers a token returned by the issuer to the client, for the client to provide to the server.

The edge system client component (36) is a software element, such as a web browser, on the edge system.

The edge system activity requestor component (38) is a software element on the edge system. Under the direction of the user (52), this component will contact the identity provider query responder (20), obtain records concerning the activities of the identity selector, and update the activity database (40). The behavior of the edge system activity requestor component is described by the flowchart of FIG. 12A, FIG. 12B, FIG. 12C and FIG. 12D.

The edge system activity database component (40) can be implemented as a relational database. There are two tables in this database, as illustrated in FIG. 13, the trace table (490) and the network table (492).

The edge system activity database trace table (490) contains one row for each trace claim. The rows of this table are created by the edge system activity requester component (38). The columns of this table are:
 IDP: an identifier for the identity provider that generated the trace claim,
 EVENT UNIQUE ID: the unique identifier for the trace claim assigned by the tracing service,
 RP UNIQUE ID: the unique identifier for the relying party for which the trace claim was generated,
 RP NAME: the name of the relying party,
 EVENT DATE: the date and time that the token containing this trace claim was received by the relying party,
 CLIENT: the network addresses of the client which submitted the token containing this trace claim to the relying party,
 TRACE: the contents of the trace claim generated by the identity provider, and
 STATUS: a status indication assigned by the activity requester.

The edge system activity database network table (492) contains one row for each network address assignment of the edge system. The rows of this table are created by the edge system address monitor component (56). The columns of this table are:
 START DATE: the date and time that the network assignment began,
 END DATE: the date and time that the network assignment ended, or NULL if the assignment is still valid,
 INTERFACE: an identifier for the network interface on the edge system,
 DHCP SERVER: the identity of the DHCP server which performed the network address assignment, or NULL if the assignment was not provided by a DHCP server, and
 INT ADDRESS: the network address assigned to the interface.

Figure 14:
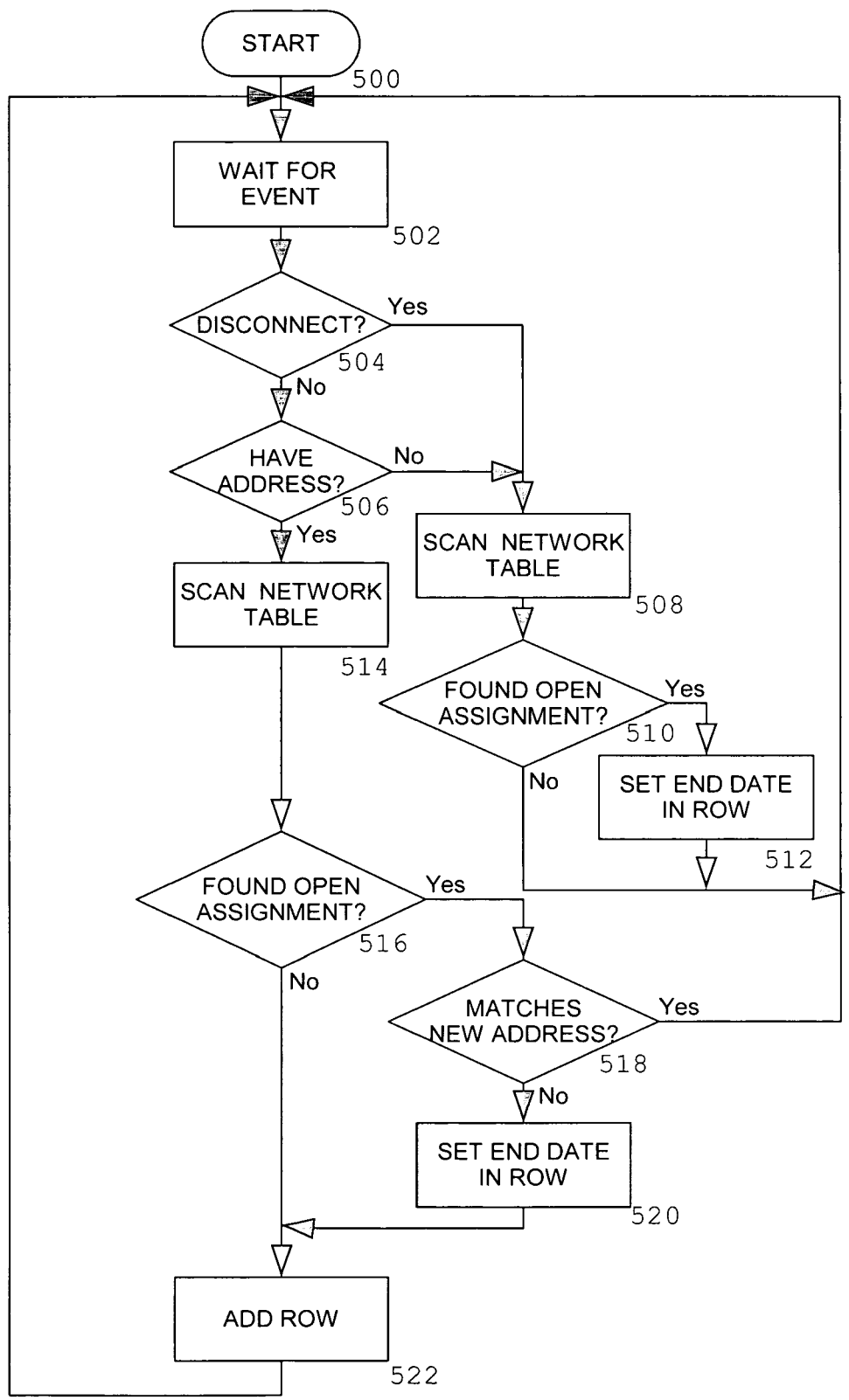
FIG. 14 is a flowchart illustrating the behavior of an edge system address monitor component (56).

The edge system address monitor component (56) is a software component on the edge system. It updates the activity database (40). The behavior of this component is illustrated by the flowchart of FIG. 14.

The relying party server component (46) is a software element, typically a web server, operated by the relying party. This component receives a token generated by the identity provider issuer (22) from the edge system client (36), and provides it to the authorization component (54).

Figure 4:
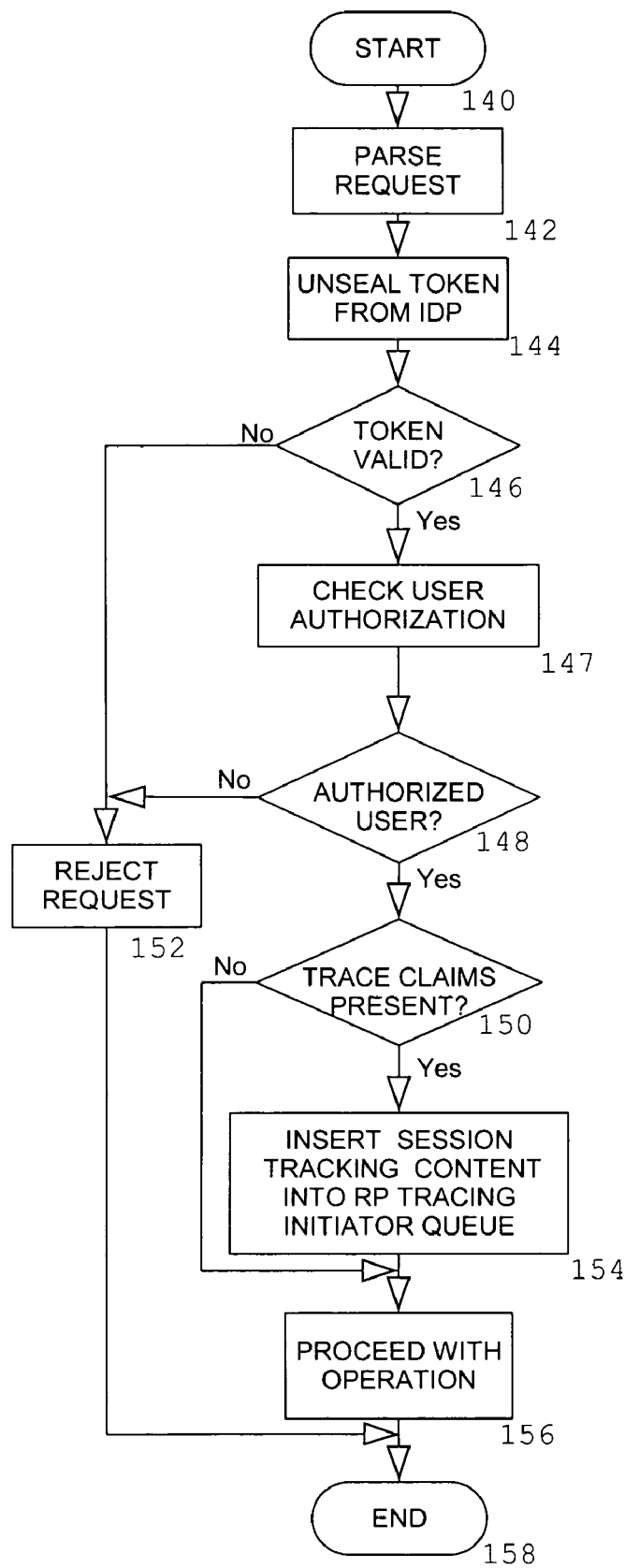
FIG. 4 is a flowchart illustrating the behavior of a relying party authorization component (54).

The relying party authorization component (54) is a software element operated by the relying party. This component receives a token generated by the identity provider issuer (22), and places claims in the queue (44). The behavior of this component is illustrated by the flowchart of FIG. 4.

The relying party database component (50) is a software element in the relying party which provides persistent storage for the configuration data required by the authorization component (54) and the tracing initiator component (48), specifically
 the set of identity providers which are recognized for issuing tokens,
 the access control rules specification of which users are authorized to use the service, and
 the network address and access credentials of the tracing service tracing responder (30).

The relying party queue component (44) is a software element in the relying party which provides persistent storage for trace claims to be transferred to the tracing service. Elements are added to the queue by the relying party authorization component (54), and are removed by the tracing initiator (48). Each element in the queue comprises:
 IDP: an identifier for the identity provider that generated the trace claim,
 EVENT DATE: the date and time the trace claim was received by the relying party,
 CLIENT: the network addresses of the edge system client which sent a token to the server,
 USER: the identity of the user in the token sent to the server, and
 TRACE: the contents of the trace claim.

Figure 5A:
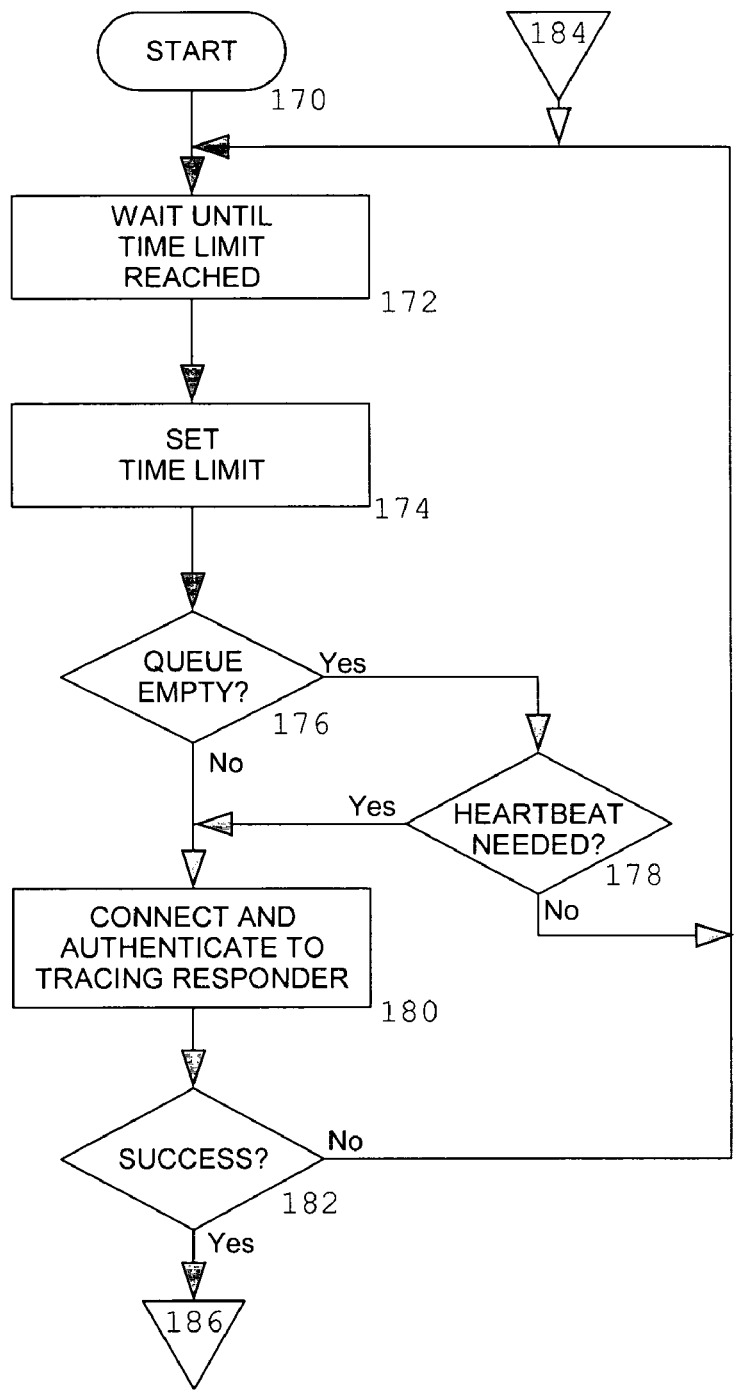
FIG. 5A and FIG. 5B are a flowchart illustrating the behavior of a relying party tracing initiator component (48).
Figure 5B:
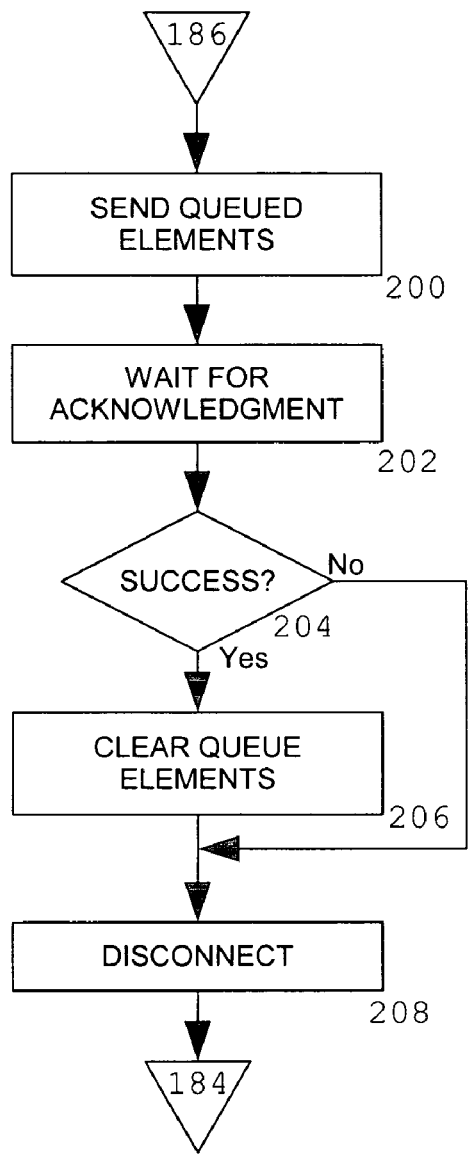

The relying party tracing initiator component (48) is a software element operated by the relying party. This component obtains claims from the queue (44) and transmits them to the tracing service tracing responder (30). The behavior of this component is illustrated by the flowchart of FIG. 5A and FIG. 5B.

Figure 6:
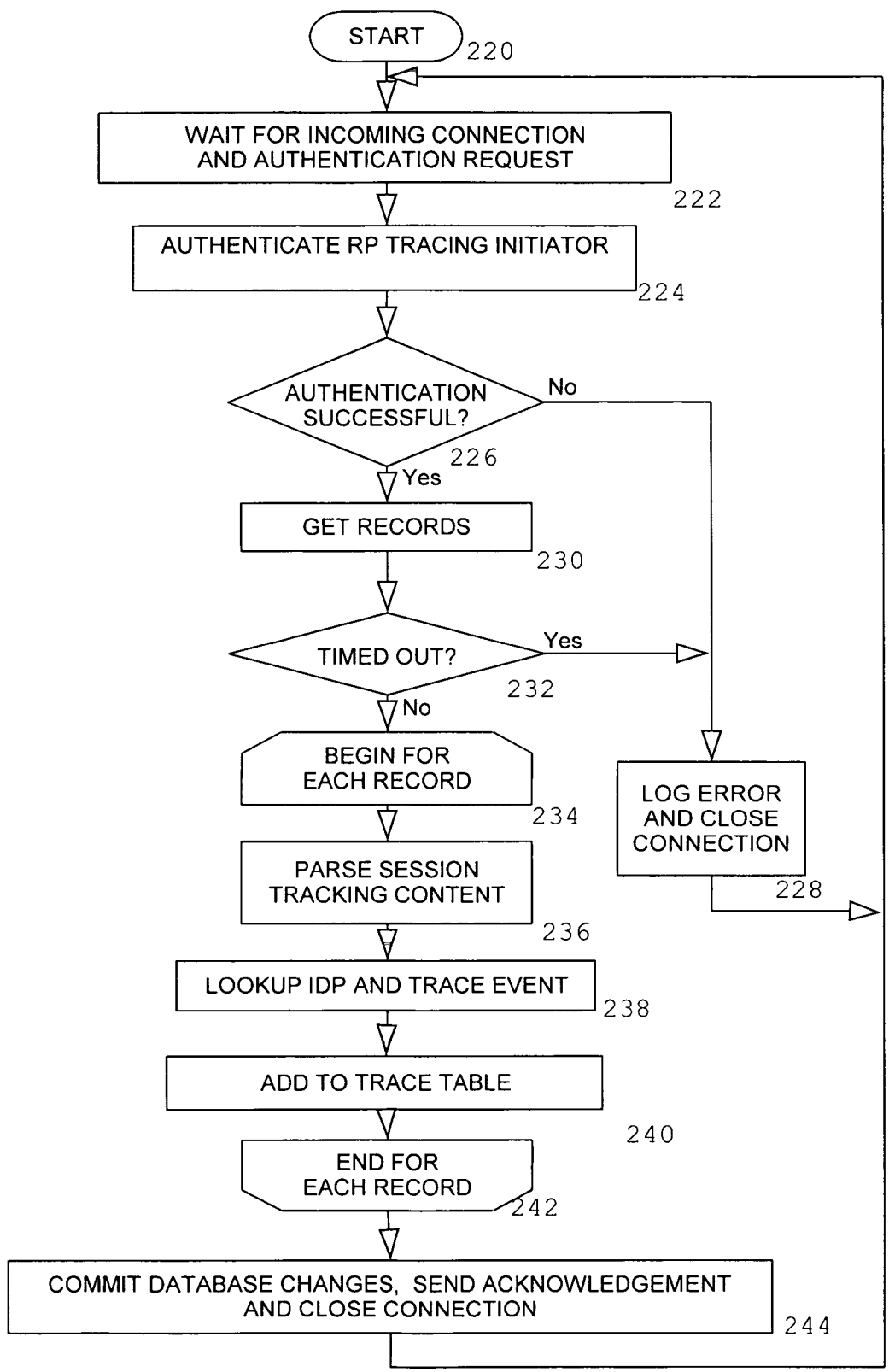
FIG. 6 is a flowchart illustrating the behavior of a tracing service tracing responder component (30).

The tracing service tracing responder component (30) is a software element operated by the tracing service. This component obtains claims from the relying party tracing initiator (48) and stores them in the trace database (28). The behavior of this component is illustrated by the flowchart of FIG. 6.

The tracing service trace database component (28) can be implemented as a relational database. There are five tables in this database, as illustrated in FIG. 8A and FIG. 8B: the relying party table (280), the identity provider table (282), the peering table (284), the certificate table (294) and the trace table (296).

The tracing service trace database relying party table (280) contains one row for each relying party. The primary key of this table is the value of the RP UNIQUE ID column. The columns of this table are:
 RP UNIQUE ID: a unique identifier for the relying party,
 RP NAME: the name of the relying party,
 NETWORKS: a set of network address prefixes for the network addresses used by the relying party tracing initiator as the source of requests sent to the tracing responder, CREDENTIAL: the authentication credential sent by the relying party tracing initiator, and STATE: an indication whether this row is to be used for authenticating incoming requests from relying parties.

The tracing service trace database identity provider table (282) contains one row for each identity provider. The primary key of this table is the value of the IDP UNIQUE ID column. The columns of this table are:

IDP UNIQUE ID: a unique identifier for the identity provider,

IDP NAME: the name of the identity provider,

NETWORKS: a set of network address prefixes for the network addresses used by the identity provider tracing update requestor as the source of requests sent to the tracing update provider, CREDENTIAL: the authentication credential sent by the identity provider tracing update requestor, and STATE: an indication whether this row is to be used for authenticating incoming requests from identity providers.

The tracing service trace database peering table (284) contains one row for each relationship between a relying party and an identity provider. The primary key of this table is a combination of the values of the RP UNIQUE ID and the IDP UNIQUE ID columns. The columns of this table are:

RP UNIQUE ID: a foreign key referencing the RP UNIQUE ID column of the relying party table (280), IDP UNIQUE ID: a foreign key referencing the IDP UNIQUE ID column of the identity provider table (282), and STATE: an indication whether this row indicates a currently active relationship between the indicated relying party and identity provider.

The tracing service trace database certificate table (294) contains one row for each X.509 certificate path of an identity provider. The columns of this table are:

UNIQUE ID: a foreign key referencing the IDP UNIQUE ID column of the relying party table (282), ISSUER: the distinguished name of the issuer of a certificate to an identity provider, SERIAL: the serial number of a certificate issued to an identity provider, CERT: the binary value of an X.509 certificate issued to an identity provider, PATH: the set of certificates forming a trust path to the certificate in the CERT column, and STATE: an indication of whether the certificate in the CERT column is currently valid.

The tracing service trace database trace table (296) contains one row for each trace claim. Rows are added to this table by the tracing responder component (30) and are removed by the tracing update provider (26). The primary key of the table is the value of the EVENT UNIQUE ID column. The columns of this table are:

RP UNIQUE ID: a foreign key referencing the RP UNIQUE ID column of the relying party table (280), EVENT UNIQUE ID: a unique identifier for the trace claim, EVENT DATE: the date and time the trace claim was received by the relying party, CLIENT: the network addresses of the edge system client which sent a token to the server, USER: the identity of the user in the token sent to the server, TRACE: the contents of the trace claim, IDP UNIQUE ID: a foreign key referencing the IDP UNIQUE ID column of the identity provider table (282), STATE: an indication of the state of this trace claim, and LAST ACCESS DATE: the date and time this trace claim was last accessed by the tracing update provider (26).

Figure 7:
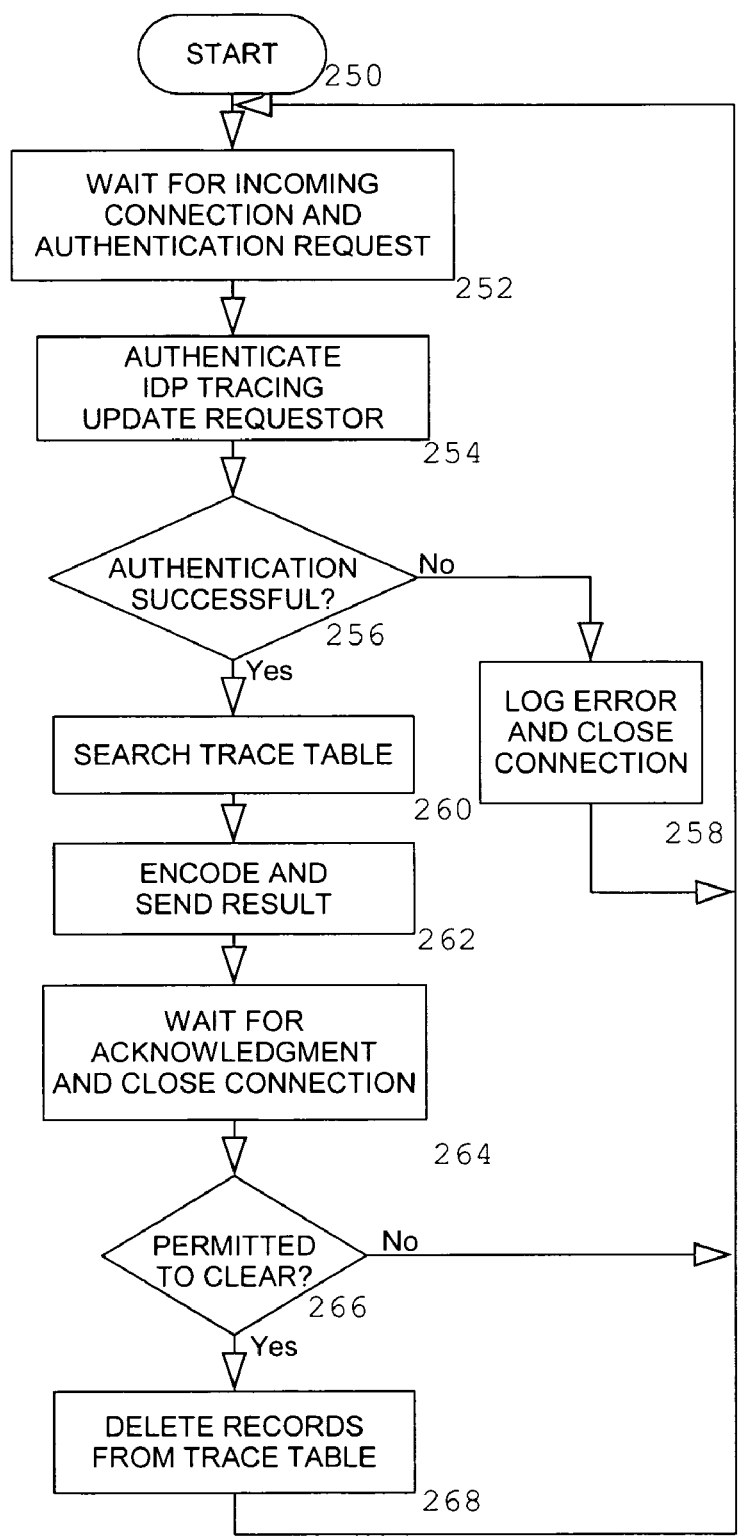
FIG. 7 is a flowchart illustrating the behavior of a tracing service tracing update provider component (26).

The tracing service tracing update provider component (26) is a software element operated by the tracing service. This component receives requests from the identity provider tracing update requestor (18), and replies with trace claims from the trace database (28). The behavior of this component is illustrated by the flowchart of FIG. 7.

Figure 9A:
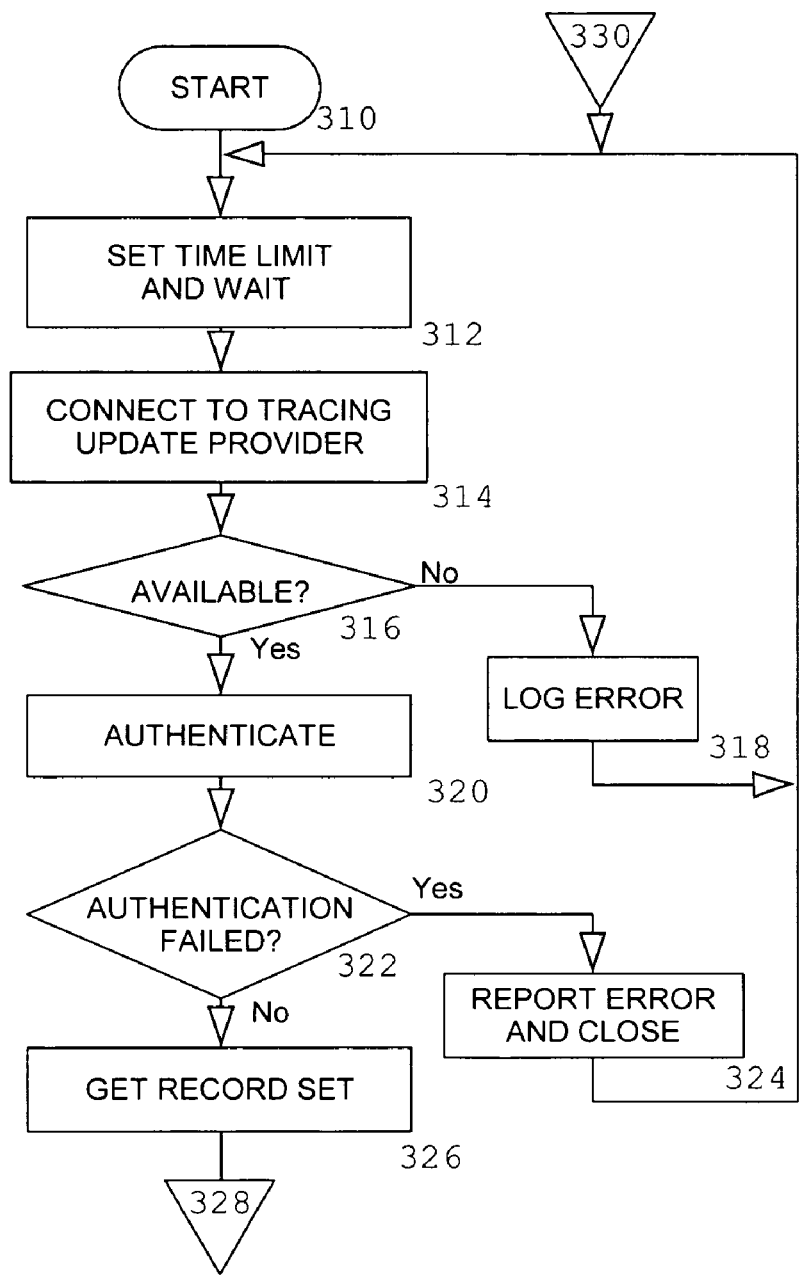
FIG. 9A and FIG. 9B are a flowchart illustrating the behavior of an identity provider tracing update requestor component (18).
Figure 9B:
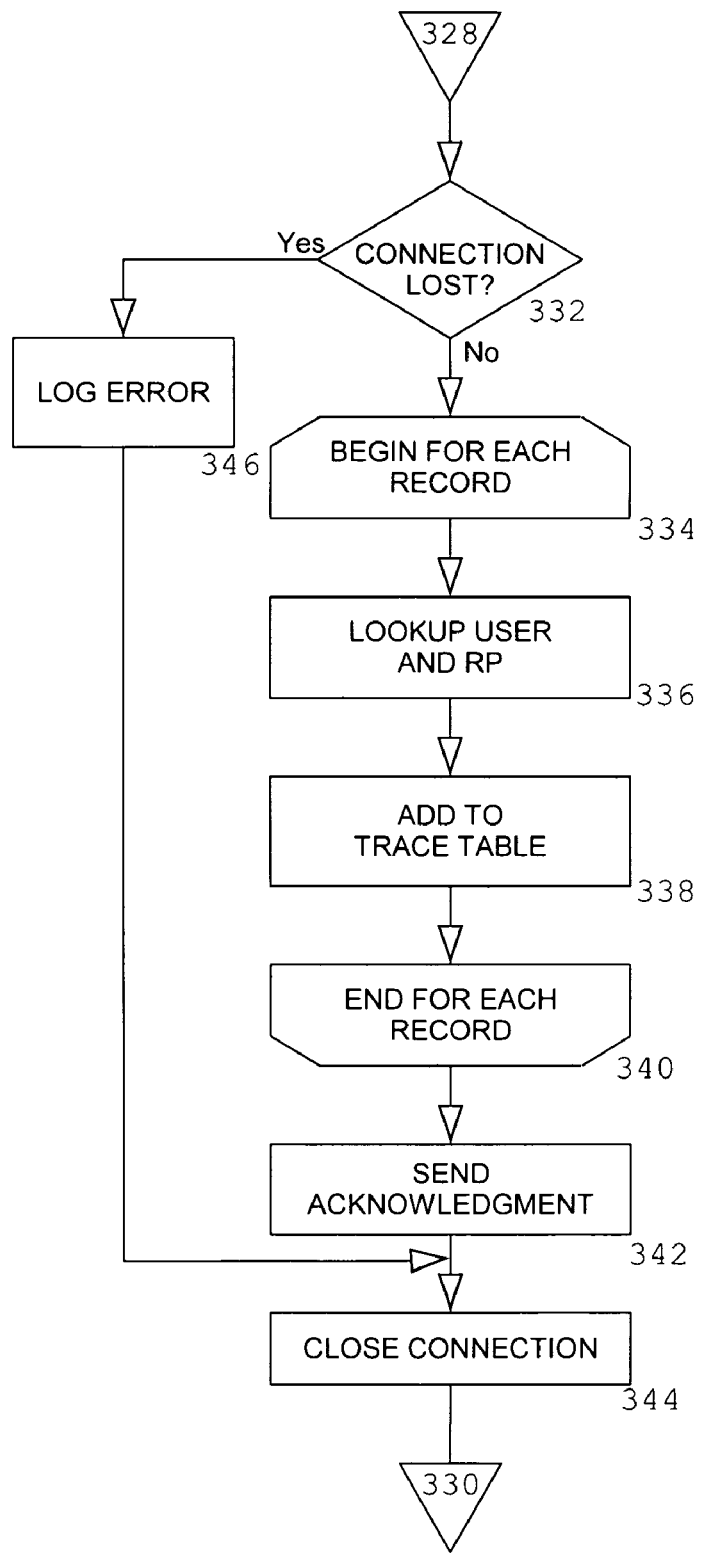

The identity provider tracing update requester component (18) is a software element operated by the identity provider. This component obtains trace claims from the tracing service tracing update provider (26) and stores them in the user database (16). The behavior of this component is illustrated by the flowchart of FIG. 9A and FIG. 9B.

The identity provider user database component (16) can be implemented as a relational database. There are two tables in this database, as illustrated in FIG. 11: the user table (390) and the trace table (392).

The identity provider user database user table (390) contains one row for each user. The primary key of this table is the value in the USER UNIQUE ID column. The columns of this table are:

USER UNIQUE ID: a unique identifier for the user,

USER NAME: the login name of the user,

CREDENTIALS: the authentication credentials of the user, and

STATE: an indication of whether this row is to be used for authenticating a user.

The identity provider user database trace table (392) contains one row for each trace claim. Rows are added to this table by the tracing update requestor (18) and are removed by the query responder (20). The columns of this table are:

USER UNIQUE ID: a foreign key referencing the USER UNIQUE ID column of the user table (390), EVENT UNIQUE ID: a unique identifier for the trace claim, RP UNIQUE ID: a unique identifier of the relying party which received this trace claim, RP NAME: the name of the relying party which received this trace claim, EVENT DATE: the date and time the trace claim was received by the relying party, CLIENT: the network addresses of the edge system client which sent a token to the relying party server, and TRACE: the contents of the trace claim.

Figure 3:
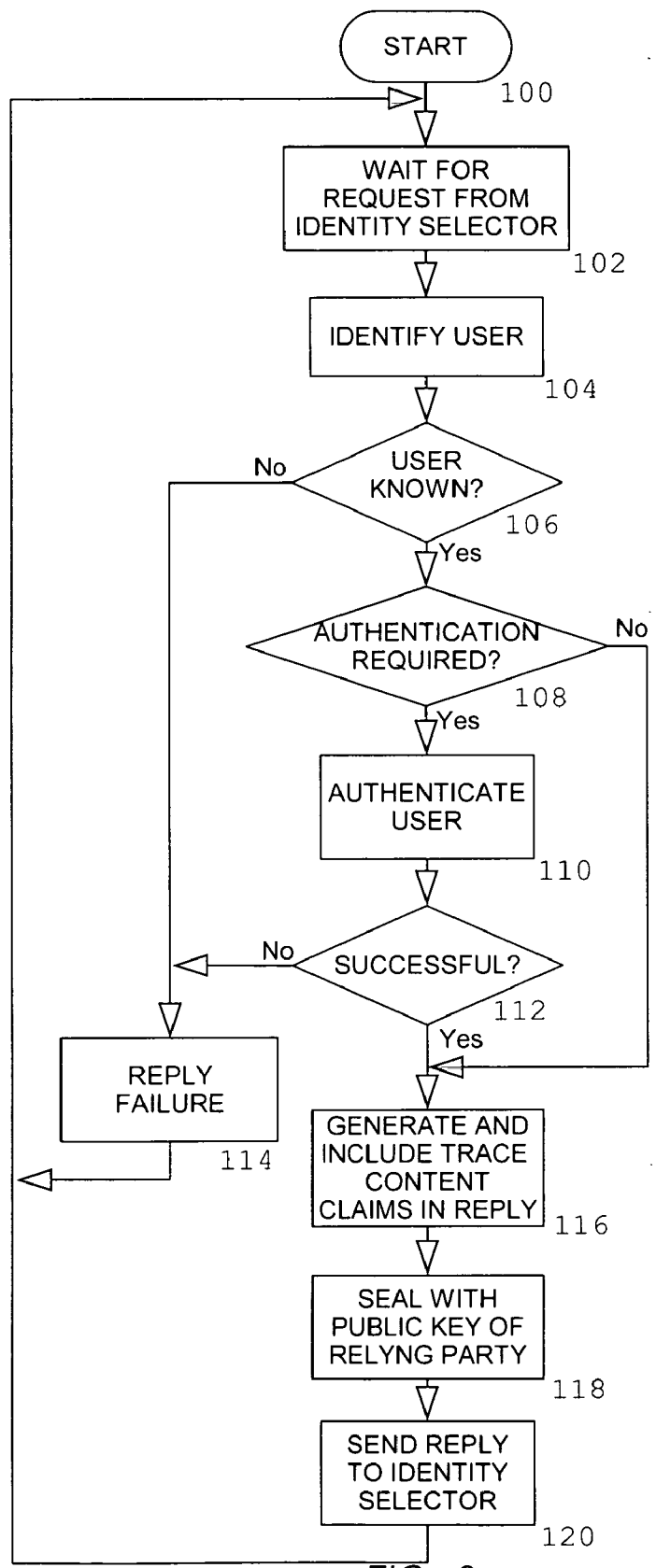
FIG. 3 is a flowchart illustrating the behavior of an identity provider issuer component (22).

The identity provider issuer component (22) is a software element operated by the identity provider. This component is typically implemented as part of a web server. The behavior of this component is illustrated by the flowchart of FIG. 3.

Figure 10:
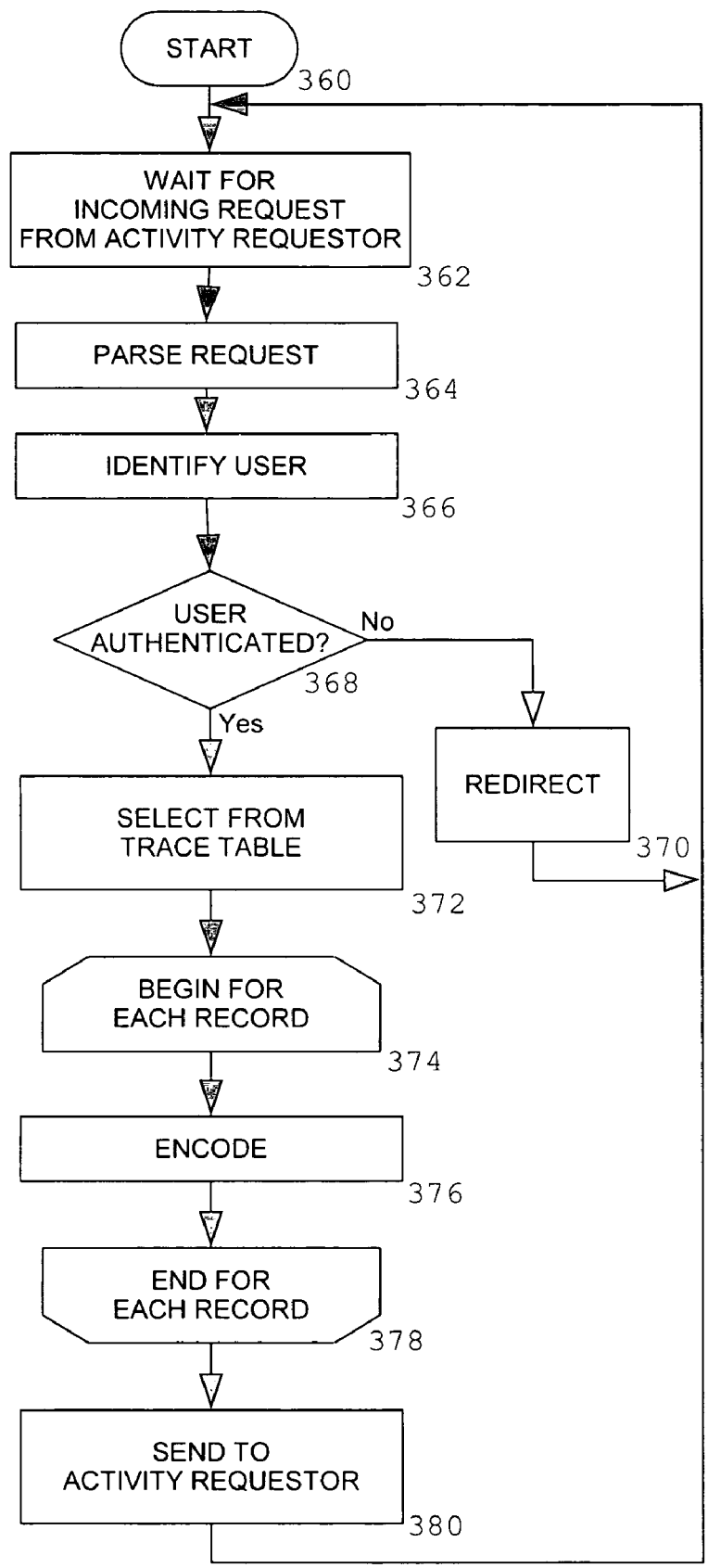
FIG. 10 is a flowchart illustrating the behavior of an identity provider query responder component (20).

The identity provider query responder component (20) is a software element operated by the identity provider. This component is typically implemented as part of a web server. The behavior of this component is illustrated by the flowchart of FIG. 10.

The time server (58) is a component responsible for maintaining synchronization of clocks between the computer systems in the identity provider, relying party, tracing service, and the edge system, using a protocol such as the Network Time Protocol (NTP).

The DHCP server (60) is a network address server component responsible for providing a network address to an end system (32), using a protocol such as the Dynamic Host Configuration Protocol (DHCP).

The processing components of this invention can be implemented as software running on computer systems attached to a network.

Figure 15:
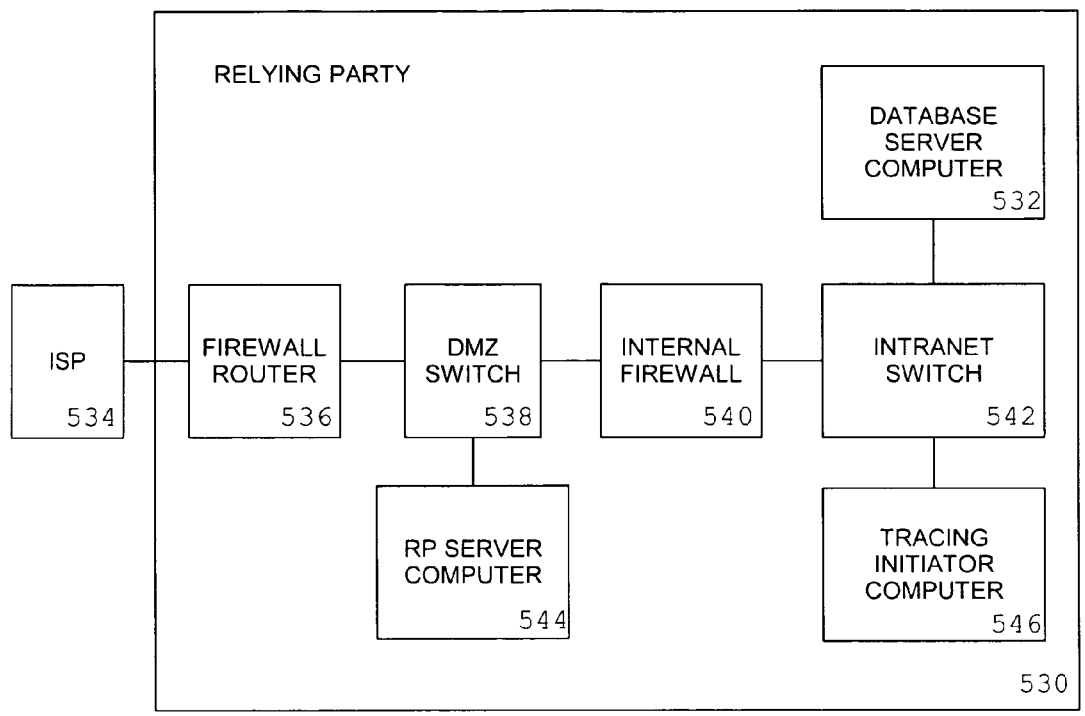
FIG. 15 is a diagram illustrating a network architecture of a relying party.

An example of the computer systems attached to a local area network of a relying party (42) is illustrated in FIG. 15. In this network (530), the server component and authorization component (54) are software deployed on the RP server computer (544), the queue component (44) and database component (50) are stored on the database server computer (532), and the tracing initiator computer (48) is software deployed on the tracing initiator computer (546).

Figure 16:
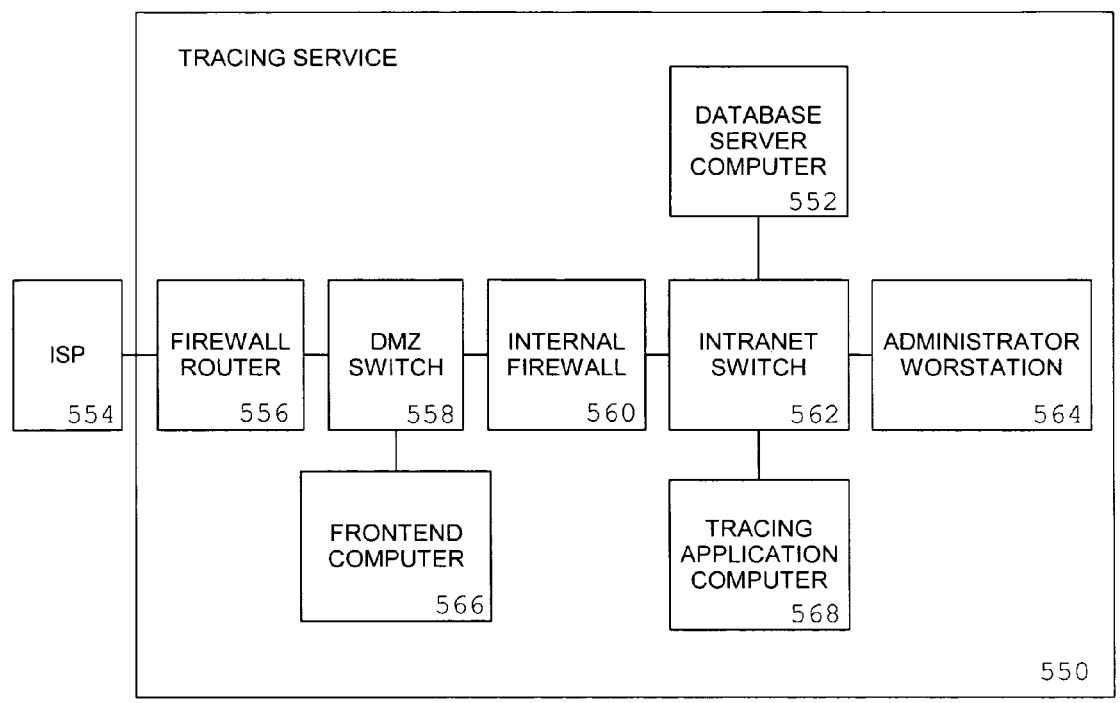
FIG. 16 is a diagram illustrating a network architecture of a tracing service.

An example of the computer systems attached to a local area network of a tracing service (24) is illustrated in FIG. 16. In this network (550), the tracing update provider component (26) and tracing responder component (30) are software deployed on the tracing application computer (568), and the trace database (28) is stored on the database server computer (552).

Figure 17:
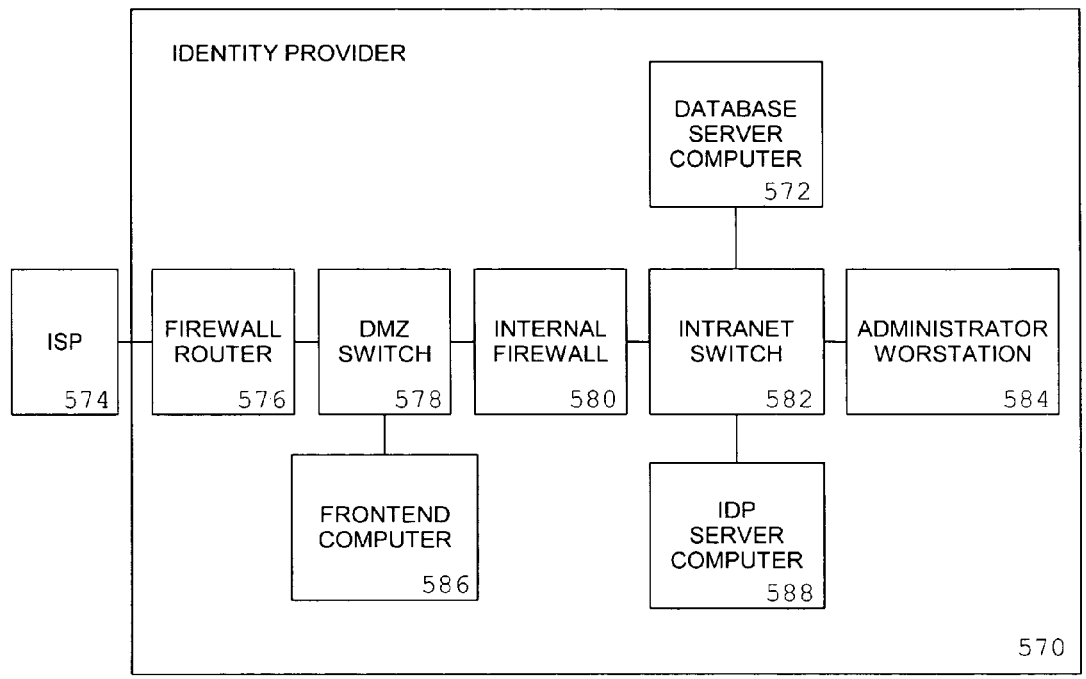
FIG. 17 is a diagram illustrating a network architecture of an identity provider.

An example of the computer systems attached to a local area network of an identity provider (14) is illustrated in FIG. 17. In this network (570), the issuer (22), query responder (20) and tracing update requestor (18) are software deployed on the IDP server computer (588), and the database is stored on the database server computer (572).

Figure 18:
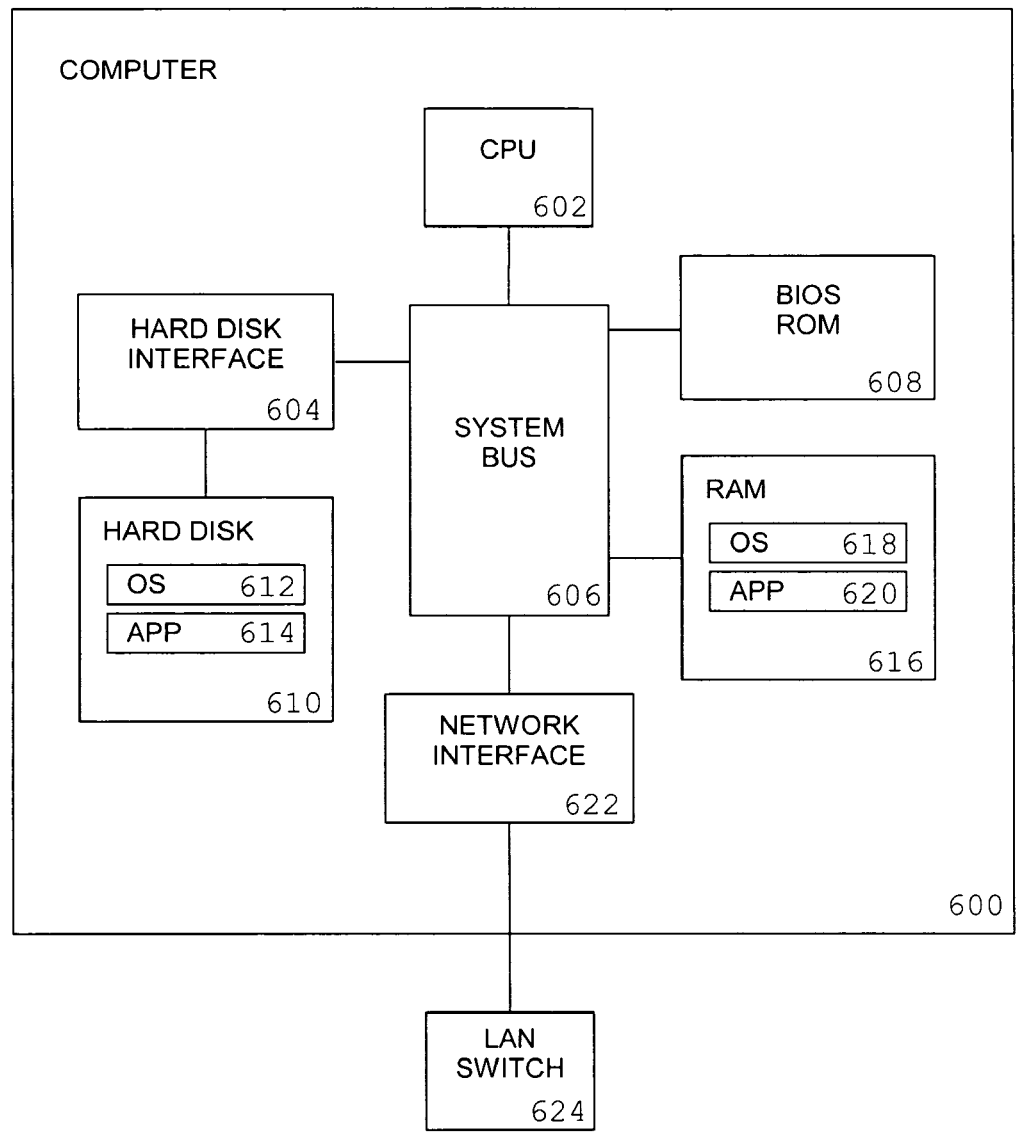
FIG. 18 is a diagram illustrating the typical components of a server computer.

The diagram of FIG. 18 illustrates the typical components of a server computer (600). Examples of server computers include the relying party RP server computer (544), the relying party database server computer (532), the tracing service tracing application computer (568), the tracing service database server computer (552), the identity provider IDP server computer (588) and the identity provider database server computer (572). Components of the server computer include a CPU (602), a system bus (606), a hard disk interface (604), a hard disk (610), a BIOS ROM (608), random access memory (616), and a network interface (622). The network interface connects the computer to a local area network switch (624). The hard disk (610) stores the software and the persistent state of the operating system (612) and applications (614) installed on that computer. The random access memory (616) holds the executing software and transient state of the operating system (618) and applications (620).

Figure 19:
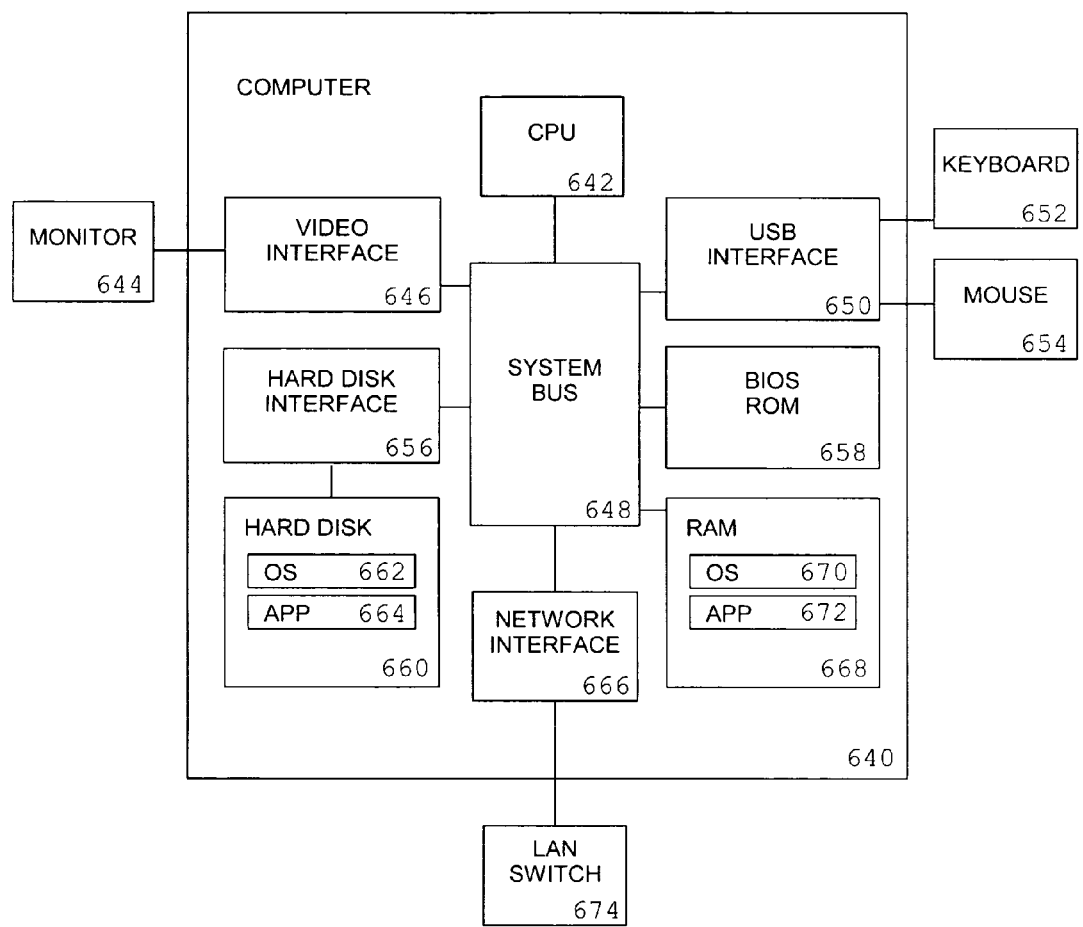
FIG. 19 is a diagram illustrating the typical components of a workstation computer.

The diagram of FIG. 19 illustrates the typical components of a workstation computer (640). Examples of workstation computers include the tracing service administrator workstation computer (564) and the identity provider administrator workstation computer (584). Components of the workstation computer include a CPU (642), a system bus (648), a video interface (646) to a monitor (644), a USB interface (650) to a keyboard (652) and mouse (654), a hard disk interface (656), a hard disk (660), a BIOS ROM (658), a network interface (666), and random access memory (668). The network interface (666) connects the computer to a local area network switch (674). The hard disk (660) stores the software and the persistent state of the operating system (662) and applications (664) installed on that computer. The random access memory (668) holds the executing software and transient state of the operating system (670) and applications (672).

Figure 20:
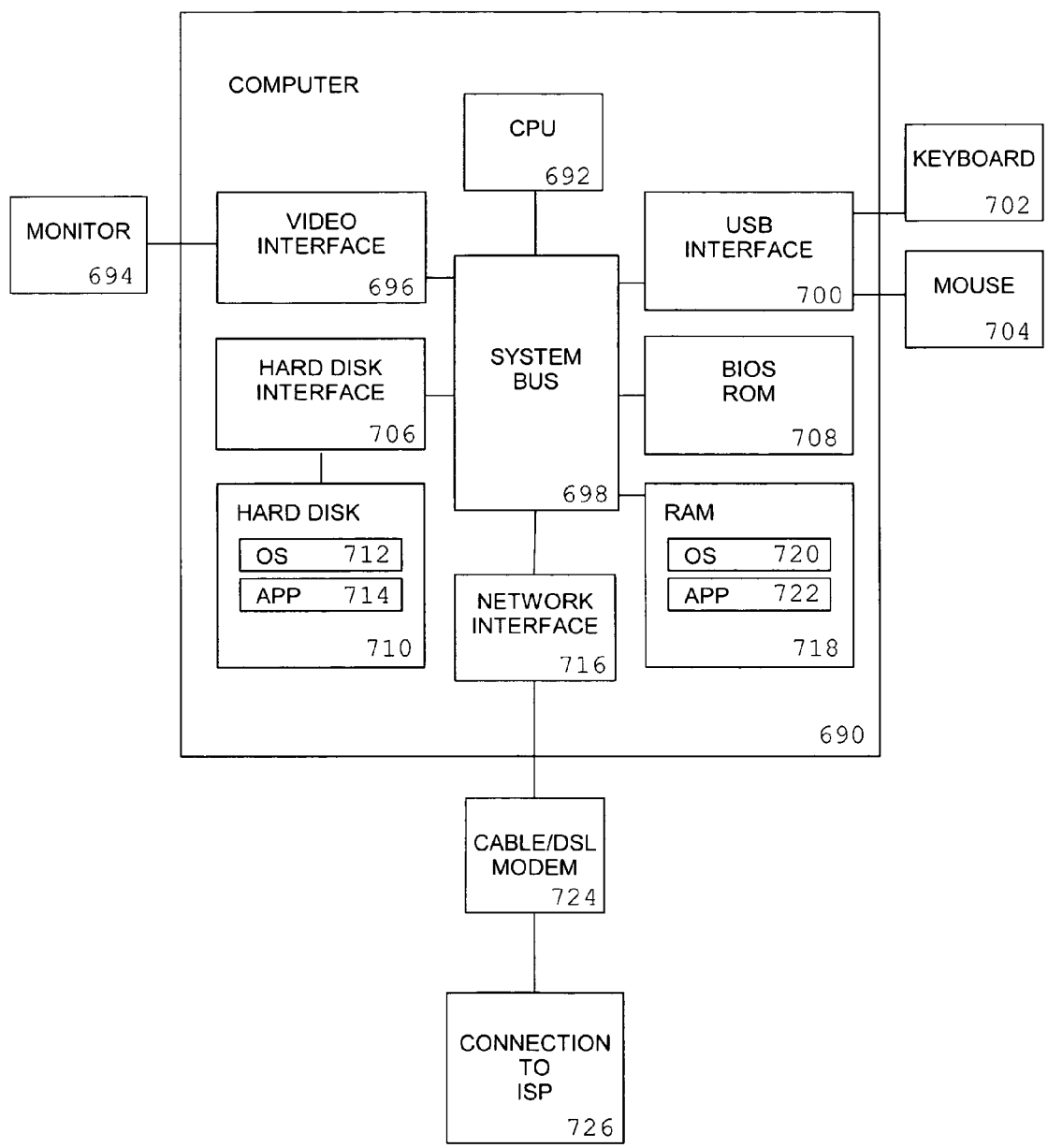
FIG. 20 is a diagram illustrating the typical components of an edge system computer.

The diagram of FIG. 20 illustrates the typical components of a home computer (690). An example of a computer system in this invention that could be a home computer is the edge system (32). Components of the home computer include a CPU (692), a system bus (698), a video interface (696) to a monitor (694), a USB interface (700) to a keyboard (702) and mouse (704), a hard disk interface (706), a hard disk (710), a BIOS ROM (708), a network interface (716), and random access memory (718). The network interface (716) connects the computer to a cable or DSL modem (724) which provides the computer with a connection to its Internet service provider (726). The hard disk (710) stores the software and the persistent state of the operating system (712) and applications (714) installed on that computer. The random access memory (718) holds the executing software and transient state of the operating system (720) and applications (722).

Operation—Preferred Embodiment

The behavior of an identity provider issuer component (22) is illustrated by the flowchart of FIG. 3. There may be one or more threads of execution within the issuer component, operating in parallel with each other. At step 102, a thread within the component will wait for a request from the edge system identity selector (34). If there are multiple threads of execution, then a request will be provided to at most one thread. At step 104, the thread will identify the user making the request. At step 106, the thread will determine whether the user is known, by searching the user table (390) for a row in which the value in USER NAME field matches the name of the user sending the request, and the value in the STATUS field indicates the user can be authenticated. If the user is not known, then at step 114 the thread will reply failure to the identity selector. Otherwise, if the user is known, then at step 108, the thread will determine whether the user has been authenticated, by checking whether the request includes a recently issued "cookie". If the user has not been authenticated, then at step 110, the thread will authenticate the user, by obtaining authentication credentials, such as a password, from the user. At step 112, the thread will check whether the user has been successfully authenticated, by comparing the credential provided by the user with the value in the CREDENTIAL field in the row obtained from the user table. If not, then at step 114, the thread will reply failure to the identity selector. Otherwise, if the user has been successfully authenticated, then at step 116 the thread will generate and include trace claims in the token for the reply message, in which the trace claims contains a new, globally unique identifier. At step 118, the thread will seal the token, by encrypting the token contents using the public key of the relying party. At step 120, the thread will send the encrypted token to the identity selector.

The edge system identity selector component (34), when it has received the encrypted token from the identity provider, will transfer it to the edge system client component (36). The edge system client component will send the encrypted token to the relying party server (46), along with the IP address of the edge system interface on which the client communicates with the relying party server. The relying party server (46) will provide the encrypted token and network address it receives to the relying party authorization component (54)

The behavior of a relying party authorization component (54) in processing a request is illustrated by the flowchart of FIG. 4. There can be one or more threads of execution within the component, each operating in parallel with each other. At step 140, a thread will receive a request forwarded from the server component (46). If there are multiple threads of execution, then a request will be provided to at most one thread. At step 142, the thread will parse the request to extract the encrypted token generated by the identity provider, the network address provided by the edge system, and the network address from which the request was received (these two addresses may be different if there is an intervening network address translation firewall in the network path between the edge system and the relying party). At step 144, the thread will unseal the token encrypted by the identity provider, by using the private key of the relying party server. At step 146, the thread will check whether the unsealed token is valid, by determining whether the decrypted information is in a valid format. If the token is not valid, then at step 152, the thread will reject the request. Otherwise, at step 147, the thread will check whether the user identified in the decrypted token is authorized to access the server, by looking up the identity of the user in the access control rules in the relying party database (50). If the user is not authorized, then at step 152 the thread will reject the request. Otherwise, at step 150, the thread will check whether there were one or more trace claims present in the token. If there were no trace claims present, then at step 152 the thread will reject the request. Otherwise, if there were trace claims present, then at step 154 the thread will add to the relying party tracing initiator queue (44) a record for each trace claim. Each record will include an identifier of the identity provider, the date and time the trace claim was received by the relying party, the network addresses of the edge system client which sent a token to the server, the identity of the user in the token sent to the server, and the session tracking content from the trace claim. At step 156, the thread will indicate to the server that it should continue with the requested operation.

The behavior of a relying party tracing initiator component (48) is illustrated by the flowchart of FIG. 5A and FIG. 5B. The component has one thread of execution for each tracing service supported by the relying party. At step 172, a thread will wait for a predefined time interval, such as 5 minutes. At step 174, the thread will check whether the relying party tracing initiator queue (44) is empty of trace claims to send to the tracing service. If the queue is empty of trace claims to send to the tracing service, then at step 176 the thread will check whether a heartbeat message is needed, which depends on the configuration of the tracing service. If no heartbeat is needed, then the thread will loop back to step 172. Otherwise, if the queue is not empty of trace claims to send to the tracing service, or if a heartbeat is needed, then at step 178 the thread will establish a connection over the network to the tracing service trace responder (30) and authenticate the relying party to that trace responder. If the attempt to establish the connection was not successful or the trace responder rejected the authentication, then the thread will loop back to step 172. Otherwise, at step 200, the thread will send the queued elements from the relying party tracing initiator queue over the connection to the tracing service trace responder, using a web services protocol encoded using SOAP. At step 202, the thread will wait for an acknowledgment to be returned by the tracing service trace responder. At step 204, if the tracing service trace responder successfully acknowledged to the thread the receipt of the queued elements, then at step 206 the thread will clear from the relying party tracing initiator queue the elements which it had sent. At step 208, the thread will disconnect the connection to the trace responder, and loop back to step 172.

The behavior of a tracing service tracing responder component (30) is illustrated by the flowchart of FIG. 6. There can be one or more threads of execution within this component, operating in parallel with each other. At step 220, a thread will wait for an incoming connection and authentication request from a relying party tracing initiator (48). If there are multiple threads of execution, then a connection and the authentication request on that connection will be provided to at most one thread. At step 224, the thread will authenticate the tracing initiator, by searching the relying party table (280) for a row in which the name of the requesting relying party matches the value in the RP NAME column, and the value in the STATE column of that row indicates that the row may be used for authentication, and then if a row is found, comparing the value of the authentication credentials provided in the authentication request with the value in the CREDENTIAL column of the row. At step 226, the thread will determine whether the authentication was successful, if a row was found and the credentials provided in the authentication request matched that in the row for that relying party in the relying party table. If the authentication was not successful, then at step 228 the thread will log an error, close the connection to the relying party tracing initiator, and loop back to step 222. Otherwise, if the authentication was successful, then at step 230 the thread will wait to receive on the connection a set of records. If the thread timed out waiting for the records or the connection was closed, then at step 228 the thread will log an error, close the connection to the relying party tracing initiator, and loop back to step 222. Otherwise, at step 234 the thread will traverse through each received record. At step 236, the thread will parse each record to extract the IDP field, the EVENT DATE field, the CLIENT field, the USER field, and the TRACE field. At step 238, the thread will search the identity provider table (282) for a row matching the identity provider, and if one is found, will search the peering table (284) for a relationship between the relying party and the identity provider. If an identity provider was found that peered with the relying party, the thread will also search the trace table (296) for a row matching the identity provider, the EVENT DATE, the CLIENT, the USER and the TRACE fields of the records. At step 240, if an identity provider was found that peered with the relying party, and no row was found in the trace table, then the thread will add a row to the trace table (296). At step 244, the thread will commit any changes it made to the database, send an acknowledgment on the connection, and close the connection. The thread will then loop back to await a new connection.

The behavior of a tracing service tracing update provider component (26) is illustrated by the flowchart of FIG. 7. There can be one or more threads of execution within this component, operating in parallel with each other. At step 252, a thread will wait for an incoming connection and authentication request from an identity provider tracing update requestor (18). If there are multiple threads of execution, then an incoming connection will be provided to at most one thread. At step 254, the thread will authenticate the source of the incoming connection, by searching the identity provider table (282) for a row in which the name of the requesting identity provider matches the value in the IDP NAME column, and the value in the STATE column of that row indicates that the row may be used for authentication, and then if a row is found, comparing the value of the authentication credentials provided in the authentication request with the value in the CREDENTIAL column of the row. At step 256, the thread will determine whether the authentication was successful, if a row was found and the credentials provided in the authentication request matched that in the row for that identity provider in the identity provider table. If the authentication was not successful, then at step 258 the thread will log an error and close the connection. Otherwise, at step 260 the thread will search the trace table for rows in which the value of the IDP UNIQUE ID column matches that of the IDP UNIQUE ID column in the row found in the identity provider rows, and from the matching rows assemble a result message containing the values of each of the columns in each of the matching rows, and for each row the value of the RP NAME column from a row in the relying party table (280) in which the value of the RP UNIQUE ID column matches that of the row from the trace table. At step 262, the thread will send the result over the connection to the identity provider tracing update requestor. At step 264, the thread will wait for an acknowledgment, and close the connection after an acknowledgment is received, the connection is closed by the identity provider tracing update requester, or the thread reaches a time limit waiting for an acknowledgment. If the acknowledgment is received and indicates that the tracing service is permitted to clear the records from the database, then at step 268 the thread will delete from the trace table the rows which had been retrieved at step 260. The thread will then loop back to wait for another request.

The behavior of an identity provider tracing update requester component (18) is illustrated by the flowchart of FIG. 9A and FIG. 9B. The component has one thread of execution for each tracing service supported by the identity provider. At step 312, a thread will wait a predetermined period of time between connections, such as 5 minutes. At step 314, the thread will attempt to establish a connection across the network to the tracing service tracing update provider (26). If the connection could not be established, then at step 318 the thread will log an error and loop back to step 312 to wait before re-attempting the connection. Otherwise, at step 320 the thread will authenticate to the tracing update provider by sending on the connection the identity provider name and authentication credentials, and waiting for a response. If the response indicates that the authentication failed, then at 324 the thread will report an error, close the connection and loop back to step 312 to wait before re-attempting the connection. If the thread successfully authenticated, then at step 326 the thread will wait to receive a set of records from the tracing update provider. For each record, the thread will search the user table (390), and if found, insert a row into the trace table (392). At step 342, the thread will commit any changes it made to the trace table, send an acknowledgment to the tracing update provider over its connection, and, at step 344, close the connection. The thread will then loop back to step 312.

The behavior of an identity provider query responder component (20) is illustrated by the flowchart of FIG. 10. There can be one or more threads of execution within this component, operating in parallel with each other. At step 362, a thread will wait for an incoming request from an edge system activity requester (38). If there are multiple threads of execution, then a request will be provided to at most one thread. At step 364, the thread will parse the request. At step 366, the thread will identify the user who sent the request. At step 368, the thread will test whether the user has been authenticated. If the user has not been authenticated, then at step 370, the thread will redirect the client to the issuer to be authenticated. Otherwise, at step 372, the thread will search the trace table (392) for rows in which the value of the USER UNIQUE ID column matches that of the unique identifier of the user. At step 374, the thread will traverse each of the selected rows. At step 376, the thread will encode the values of the EVENT UNIQUE ID column, RP UNIQUE ID column, RP NAME column, EVENT DATE column, CLIENT column and TRACE column of the row into a protocol data structure. At step 380, the thread will send the encoded rows in response to the request from the activity requester. The thread will then loop back to wait for a subsequent request.

Figure 12A:
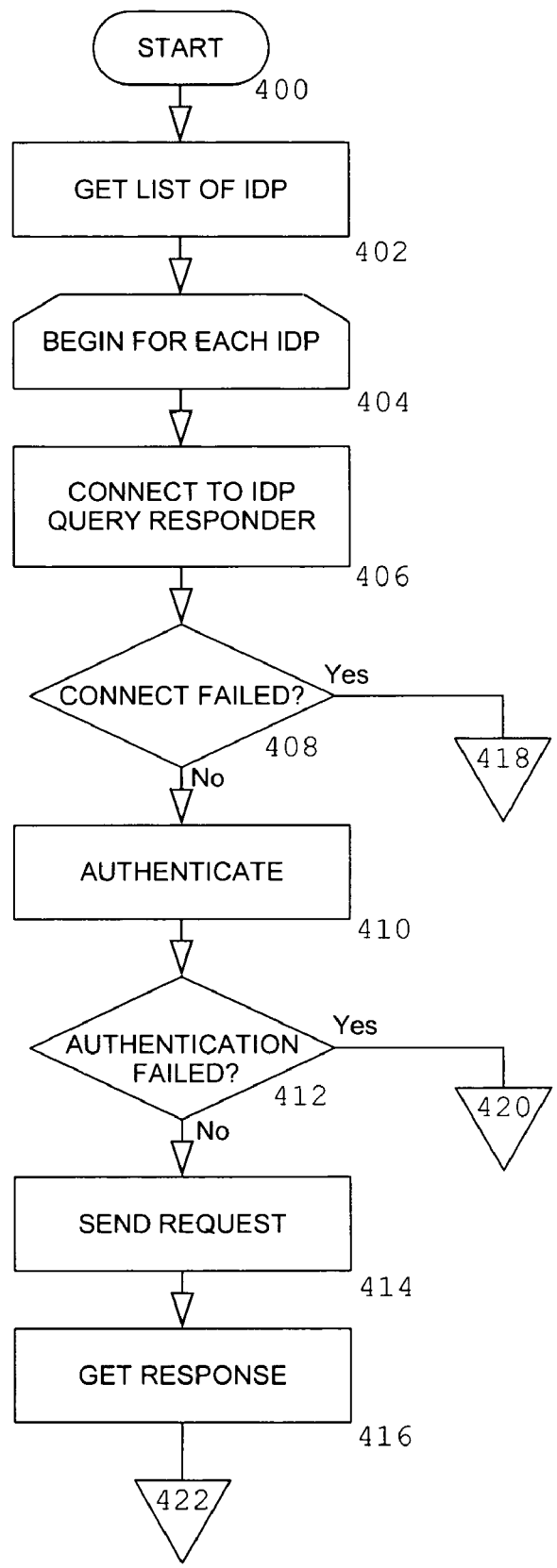
FIG. 12A, FIG. 12B, FIG. 12C and FIG. 12D are a flowchart illustrating the behavior of an edge system activity requester component (38).
Figure 12B:
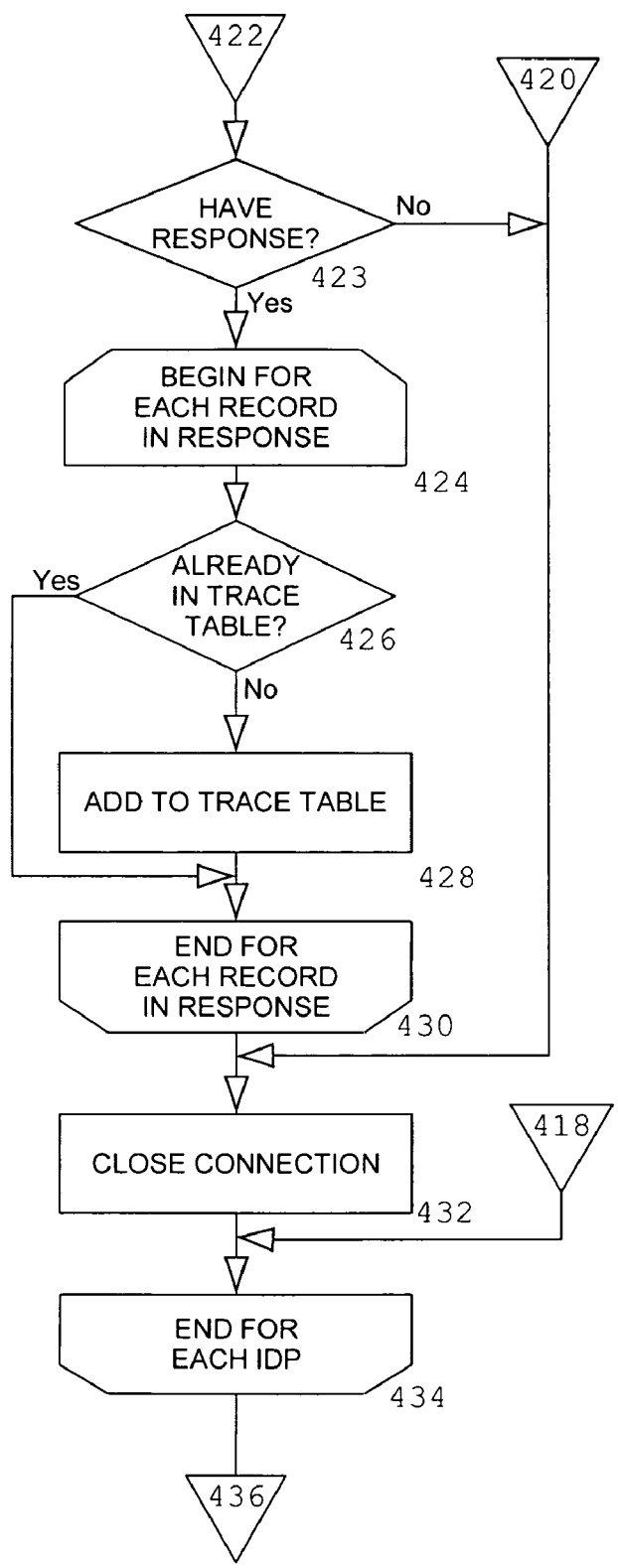
Figure 12C:
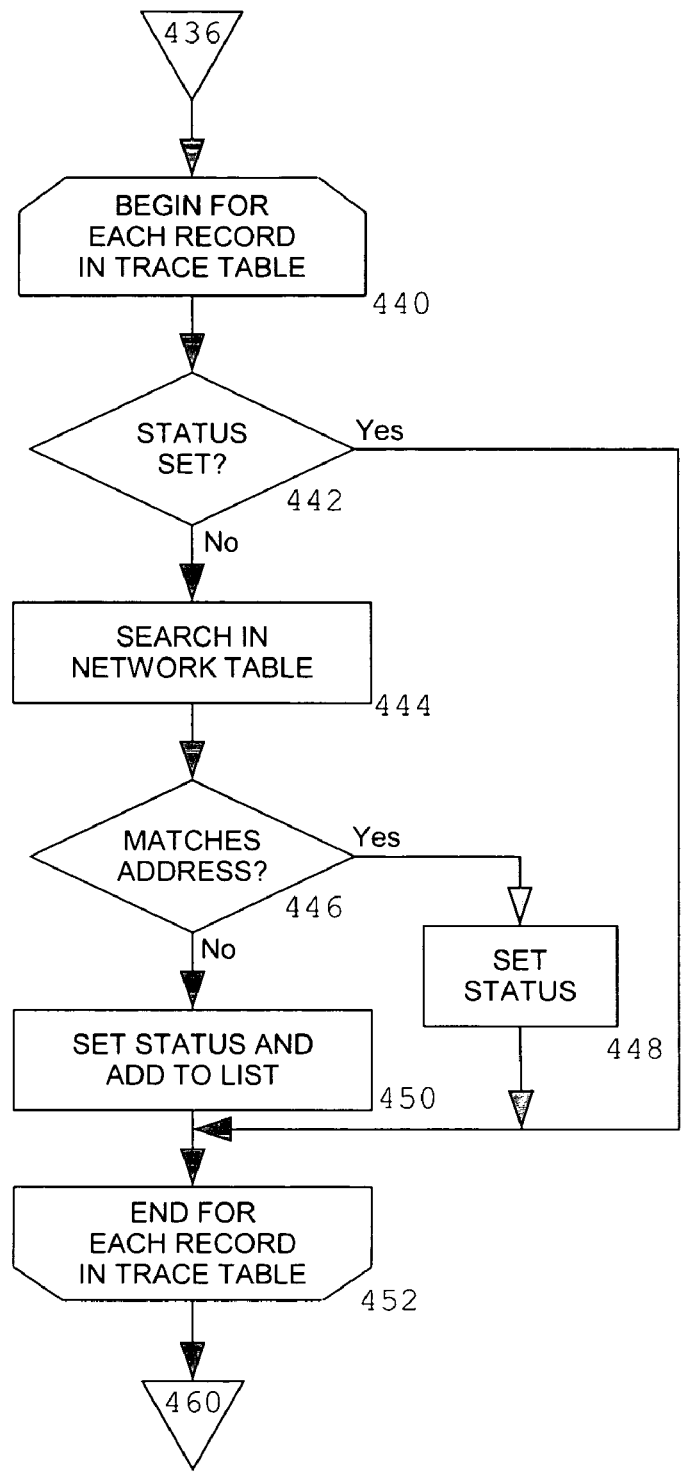
Figure 12D:
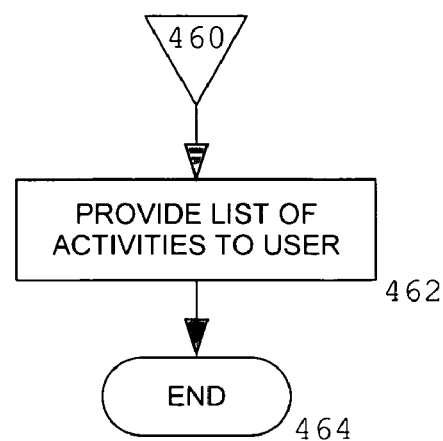

The behavior of an edge system activity requester component (38) is illustrated by the flowchart of FIG. 12A, FIG. 12B and FIG. 12C. There is a single thread of execution in the component. At step 402, the thread will assemble a list of identity providers obtained from the identity selector. At step 404, the thread will iterate through the list of identity providers. At step 406, the thread will attempt to establish a connection to the identity provider query responder. If the connection attempt was successful, then at step 410 the thread will authenticate to the identity provider. At step 412, if the authentication failed, then the thread will close the connection and continue at the next identity provider. At step 414, the thread will send a request to the identity provider query responder. At step 416, the thread will obtain a response to its request. If no response was returned, then the thread will close the connection and continue at the next identity provider. Otherwise at step 424, the thread will iterate through each record in the response. If, at step 426, a record is not already in the trace table (490), as determined by searching the trace table for a row with the same IDP, EVENT UNIQUE ID, and RP UNIQUE ID columns as the record; then, at step 428, the thread will insert a row into the trace table. At step 432, the thread will close the connection to the identity provider query responder. At step 440, the thread will traverse the records in the trace table (490). If the status on a record is not set, then at step 444 the thread will search the network table (492) for rows indicating assignments that were valid during the time of the event (from the EVENT DATE field of the record). If a record is found in the network table which matches the value of originator address of the CLIENT field of the record from the trace table, then at step 448, the thread will set the value in the STATUS column in the row in the trace table to indicate that the address was checked. Otherwise, if no record was found in the network table which matches the edge system interface address, then at step 450 the thread will set the status to indicate that the address was not found, and add the record from the trace table to a list of records of trace claims which were not generated by this edge system's network address. At step 462, the thread will present the list of events to the user (52).

The behavior of the edge system address monitor component (56) is illustrated by the flowchart of FIG. 14. There is a single thread of execution in this component. At step 502, the component will wait for an event indicating a change in the network parameters. If the event is a disconnection of a network interface, or no network address is provided in the event, then at step 508 the thread will scan the network table (492) for an open assignment for that interface, by searching for a row in which the value in the END DATE column is NULL and the value in the INTERFACE column matches the interface indicated in the event. If a row is found, then at step 512 the thread will set the value of the END DATE column in that row to the current date and time. If the event is a connection of a network interface, and a network address is provided, then at step 514 the thread will scan the network table (492) for an open assignment for that interface, by searching for a row in which the value in the END DATE column is NULL and the value in the INTERFACE column matches the interface indicated in the event. If a row is found, and the address value in the INT ADDRESS column matches the address of the interface, then no change is made to this table. Otherwise, if a row is found and the address does not match, then at step 520 the thread will set the value of the END DATE column in that row to the current date and time. At step 522, the thread will add a new row to the network table, in which the value in the START DATE is set to the current date and time, the value in the END DATE column is NULL, and the values of the INTERFACE, DHCP SERVER, and INT ADDRESS columns are as provided in the event.

CONCLUSIONS

Many different embodiments of this invention may be constructed without departing from the scope of this invention. While this invention is described with reference to various implementations and exploitations, and in particular with respect to systems for validating interactions in identity systems, it will be understood that these embodiments are illustrative and that the scope of the invention is not limited to them.

What is claimed is:

1. A method for validating the authenticity of a request for access on behalf of a user sent from an edge system as a computer comprising a central processing unit device and a random access memory device to a relying party server as a software component of a server computer connected via a network to said computer in an identity metasystem, said method comprising
   (a) storing an identifier of said edge system in an activity database,
   (b) generating at an identity provider a set of claims regarding said user and said edge system for use by said relying party server,
   (c) transferring said claims and said identifier of said edge system from said edge system to said relying party server via said network,
   (d) authorizing said end user and said edge system to perform said request at said relying party server based on said set of claims,
   (e) storing a record comprising said claims and said identifier in a relying party queue,
   (f) transferring at a later time said record from said relying party queue to a tracing service,
   (g) transferring said record from said tracing service to said identity provider,
   (h) transferring said identifier from said record from said identity provider to an activity requestor acting on behalf of said user,
   (i) retrieving a historic identifier of said edge system as of the time of said request from said activity database,
   (j) comparing said identifier from said record with said historic identifier, and
   (k) notifying said user if said identifier from said record and said historic identifier are different.

2. The method of claim 1, further comprising: transferring said identifier of said edge system from a network address server to said edge system before storing said identifier in said activity database.

3. The method of claim 1, wherein said generating said set of claims comprises encrypting said claims to an encrypted set of claims with a key encrypted with a public key of said relying party server and transferring said encrypted set of claims to said edge system.

4. The method of claim 3, wherein said transferring said claims and said identifier of said edge system from said edge system to said relying party server comprises transferring said encrypted set of claims from said edge system to said relying party server and decrypting said encrypted set of claims using a private key of said relying party server.

5. The method of claim 1, wherein said authorizing said end user and said edge system to perform said request comprises comparing a claim value obtained from said set of claims with a role value obtained from a database of said relying party server.

6. The method of claim 1, wherein said transferring said record from said relying party queue to said tracing service comprises transmitting said record over a computer network using a web service protocol.

7. A computer program product comprising a non-transitory computer readable or usable medium with software for validating the authenticity of a request for access on behalf of a user sent from an edge system to a relying party server in an identity metasystem, said computer program product comprising
   (a) instructions for storing an identifier of said edge system in an activity database,
   (b) instructions for generating at an identity provider a set of claims regarding said user and said edge system for use by said relying party server,
   (c) instructions for transferring said claims and said identifier of said edge system from said edge system to said relying party server,
   (d) instructions for authorizing said end user and said edge system to perform said request at said relying party server based on said set of claims,
   (e) instructions for storing a record comprising said authorization, said claims and said identifier in a relying party queue,
   (f) instructions for transferring at a later time said record from said relying party queue to a tracing service,
   (g) instructions for transferring said record from said tracing service to said identity provider,
   (h) instructions for transferring said record from said identity provider to an activity requester on behalf of said user,
   (i) instructions for retrieving a historic identifier of said edge system at the time of said request from said activity database,
   (j) instructions for comparing said identifier from said record with said historic identifier, and
   (k) instructions for notifying said user if said identifier from said record and said historic identifier are different.

* * * * *